US012592562B2

(12) United States Patent
Chen et al.

(10) Patent No.: US 12,592,562 B2
(45) Date of Patent: Mar. 31, 2026

(54) FREQUENCY ADAPTIVE CONTROL METHOD FOR INVERTER BASED ON MODEL PREDICTIVE VIRTUAL SYNCHRONOUS GENERATOR

(71) Applicant: SHANDONG UNIVERSITY, Shandong (CN)

(72) Inventors: Alian Chen, Jinan (CN); Tong Liu, Jinan (CN); Chenghui Zhang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 482 days.

(21) Appl. No.: 18/269,814

(22) PCT Filed: Nov. 7, 2022

(86) PCT No.: PCT/CN2022/130367
§ 371 (c)(1),
(2) Date: Jun. 27, 2023

(87) PCT Pub. No.: WO2023/088124
PCT Pub. Date: May 25, 2023

(65) Prior Publication Data
US 2024/0072541 A1 Feb. 29, 2024

(30) Foreign Application Priority Data

Nov. 17, 2021 (CN) .......................... 202111361656.2

(51) Int. Cl.
| | |
|---|---|
| *H02J 3/24* | (2006.01) |
| *H02J 3/38* | (2006.01) |
| *H02J 3/388* | (2026.01) |

(52) U.S. Cl.
CPC .............. *H02J 3/241* (2020.01); *H02J 3/388* (2020.01); *H02J 2203/20* (2020.01)

(58) Field of Classification Search
CPC ........ H02J 3/241; H02J 3/388; H02J 2203/20; H02J 3/38
See application file for complete search history.

(56) References Cited

U.S. PATENT DOCUMENTS

2023/0283076 A1* 9/2023 Inoue ........................ H02J 3/46
700/295

FOREIGN PATENT DOCUMENTS

| CN | 109256801 A | 1/2019 |
|---|---|---|
| CN | 110994685 A | 4/2020 |

(Continued)

OTHER PUBLICATIONS

Jan. 18, 2023 International Search Report issued in International Patent Application No. PCT/CN2022/130367.

(Continued)

*Primary Examiner* — Charles Cai
(74) *Attorney, Agent, or Firm* — Oliff PLC

(57) ABSTRACT

A model predictive virtual synchronous generator inverter control method considering a frequency-movement direction includes: obtaining a current frequency absolute value based on fundamental frequency of an inverter and a steady-state absolute value based on the fundamental frequency of the inverter; determining a frequency-movement state by comparing the above two absolute values: in a state of deviating from the fundamental frequency or a state of regressing to the fundamental frequency; setting a corresponding prediction output horizon according to the frequency-movement state, and constructing a cost function considering the frequency-movement state; and calculating an optimal virtual power increment value based on the cost function, then calculating an optimal virtual power, inputting the optimal virtual power to a swing equation of a (Continued)

virtual synchronous generator, and performing frequency adjustment according to an output value.

10 Claims, 3 Drawing Sheets

(56) References Cited

FOREIGN PATENT DOCUMENTS

CN 113572199 A * 10/2021 ............. H02J 3/388
CN 114123243 A 3/2022

OTHER PUBLICATIONS

Jan. 18, 2023 Written Opinion issued in International Patent Application No. PCT/CN2022/130367.

* cited by examiner

FREQUENCY ADAPTIVE CONTROL METHOD FOR INVERTER BASED ON MODEL PREDICTIVE VIRTUAL SYNCHRONOUS GENERATOR

CROSS-REFERENCE TO RELATED APPLICATIONS

The present application claims priority to Chinese Patent Application No. 202111361656.2, entitled "MODEL PREDICTIVE VIRTUAL SYNCHRONOUS GENERATOR INVERTER CONTROL METHOD CONSIDERING FREQUENCY-MOVEMENT DIRECTION", filed on Nov. 17, 2021 to the China National Intellectual Property Administration, which is incorporated herein by reference in its entirety.

TECHNICAL FIELD

The present invention belongs to the technical field of power electronics, and in particular, relates to a model predictive virtual synchronous generator inverter control method considering a frequency-movement direction.

BACKGROUND

The description in this section merely provides background information related to the present invention and does not necessarily constitute the prior art.

As an effective utilization form of distributed energy, micro-grid can transmit electric energy and provide grid support, which is an important way for effective utilization of renewable energy and an important supplement to a large power grid. The micro-grid has two modes of grid-connected operation and island operation. In an island mode, the micro-grid loses the support of the large power grid, and thus can support the common bus voltage and frequency only by relying on its internal distributed energy, micro-gas turbine and energy storage. Because the micro-grid with distributed energy lacks rotational kinetic energy of synchronous generators in the large power grid, especially when the proportion of distributed energy increases gradually, the inertia of micro-grid decreases and the stability of micro-grid weakens. A virtual synchronous generator technology can simulate the electromechanical transient characteristics of a synchronous generator, and make an inverter in the island mode have the external characteristics of the synchronous generator, such as inertia, damping, primary frequency modulation, reactive voltage regulation, etc. Therefore, the virtual synchronous generator technology can effectively increase the system inertia, which facilitates improving the stability of micro-grid in the island mode.

The inventors found that the traditional virtual synchronous generator technology has a fixed inertia parameter, which is difficult to adapt to the complex micro-grid environment. When the inertia of virtual synchronous generator is large, it is difficult for the system frequency to regress to the fundamental frequency from which it once deviates, which is disadvantageous for the system power allocation adjustment. On the contrary, when the inertia of the virtual synchronous generator is small, the anti-interference ability of the micro-grid is weak, the system stability is poor, and the load switching can easily lead to system oscillation or instability, and the control effect is poor.

SUMMARY

In order to overcome the above-mentioned deficiencies of the prior art, the present invention provides a model predictive virtual synchronous generator inverter control method considering a frequency-movement direction for improving system elasticity. Frequency-movement direction is determined by the absolute value change between the frequency value and the fundamental frequency value.

To achieve the above objective, one or more embodiments of the present invention provide the following technical solutions:

in a first aspect, the present invention discloses the model predictive virtual synchronous generator inverter control method considering a frequency-movement direction, including:

obtaining a current frequency absolute value based on fundamental frequency of an inverter and a steady-state absolute value based on the fundamental frequency of the inverter;

determining a current frequency-movement state by comparing the above two absolute values: in a state of deviating from the fundamental frequency or a state of regressing to the fundamental frequency;

setting a corresponding prediction output horizon according to the frequency-movement state, and constructing a cost function considering the frequency-movement state; and calculating an optimal virtual power increment value based on the cost function, then calculating an optimal virtual power, inputting the optimal virtual power to a swing equation of a virtual synchronous generator, and performing frequency adjustment according to an output value.

As a further embodiment, the obtaining a current frequency absolute value based on fundamental frequency of an inverter and a steady-state absolute value based on the fundamental frequency of the inverter includes:

detecting a system frequency of output of an inverter in a micro-grid island mode, calculating a system steady-state frequency from a current power of the inverter, and determining the current frequency absolute value based on the fundamental frequency and the steady-state absolute value based on the fundamental frequency.

As a further embodiment, when determining the frequency-movement state, if the current frequency absolute value based on the fundamental frequency is less than the steady-state absolute value based on the fundamental frequency, it is in a state of deviating from the fundamental frequency; and if the current frequency absolute value based on the fundamental frequency is greater than the steady-state absolute value based on the fundamental frequency, it is in a state of regressing to the fundamental frequency.

As a further embodiment, the cost function considering the frequency-movement state includes a prediction horizon minimization target for a frequency-movement fluctuation value and includes a prediction horizon minimization target for a frequency regression fluctuation value.

As a further embodiment, according to different frequency-movement states, assignments of the deviation state weight factor matrix, the regression state weight factor matrix and the power fluctuation penalty factor matrix are different, where in a frequency-deviation state, priority is given to realizing the optimization of the prediction horizon output for the frequency-deviation fluctuation value through assignment; and in a frequency regression state, priority is given to realizing the optimization of the prediction horizon output for the frequency regression fluctuation value through assignment.

As a further embodiment, the optimal virtual power is calculated from the optimal virtual power increment value and the virtual power.

As a further embodiment, after calculating the optimal virtual power, a step of correcting the optimal virtual power is further included, whether the calculated optimal virtual power exceeds a virtual power selectable range is determined, and if so, the current frequency absolute value based on the fundamental frequency of the inverter and the steady-state absolute value based on the fundamental frequency of the inverter are re-obtained, and the optimal virtual power is calculated again;

otherwise, the calculated optimal virtual power is directly input into the swing equation of the virtual synchronous generator, and the calculated virtual angular velocity is output to an integral link to achieve optimal virtual power frequency adjustment.

In a second aspect, the present invention discloses a model predictive virtual synchronous generator inverter control system considering a frequency-movement direction, including:

a frequency-movement state determination module configured to obtain a current frequency absolute value based on fundamental frequency of an inverter and a steady-state absolute value based on the fundamental frequency of the inverter, determining a frequency-movement state by comparing the above two absolute values: in a state of deviating from the fundamental frequency or a state of regressing to the fundamental frequency;

a frequency-adjustment module configured to set a corresponding prediction output horizon according to the frequency-movement state, and construct a cost function considering the frequency-movement state; and calculate an optimal virtual power increment value based on the cost function, then calculate an optimal virtual power, input the optimal virtual power to a swing equation of a virtual synchronous generator, and perform frequency adjustment according to an output value.

The above one or more technical solutions have the following beneficial effects:

1. The present invention achieves different frequency adjustment targets considering the frequency-movement state without changing the rotational inertia and damping coefficient of a virtual synchronous generator, i.e., when the frequency deviates from the fundamental frequency, the frequency change rate is effectively reduced to achieve slow frequency-movement; and when the frequency regresses to the fundamental frequency from the non-fundamental frequency value, the frequency change rate is increased effectively and quickly, so that the frequency regresses quickly. The dynamic characteristics of the system frequency are effectively improved.

2. The present invention achieves the determination of the state of the system frequency deviating from the fundamental frequency or the state of the system frequency regressing to the fundamental frequency by comparing the absolute value $|\omega_{m0}(k)|$ of the current frequency value based on the fundamental frequency with the absolute value $|\omega_{ref0}(k)|$ of the steady-state frequency value based on the fundamental frequency, and the method is simple and reliable.

3. The present invention is based on a model predictive method, which can effectively reduce the change rate of the system frequency and slow down the process of the system frequency deviating from the fundamental frequency when the system frequency moves to deviate from the fundamental frequency.

4. The present invention is based on the model predictive method, which can effectively increase the change rate of the system frequency and accelerate the process of the system frequency regressing to the fundamental frequency when the system frequency moves to regress to the fundamental frequency.

5. The present invention realizes the frequency control considering the frequency-movement state based on the virtual synchronous generator model predictive control in the discrete horizon and is applicable to a digital controller, which has great significance for the application of the inverter.

The advantages of additional aspects of the present invention will be given in part in the description which follows and, in part, will be obvious from the following description, or may be learned by practice of the present invention.

BRIEF DESCRIPTION OF THE DRAWINGS

The accompanying drawings constituting a part of the present invention are used for providing a further understanding of the present invention. The exemplary examples of the present invention and descriptions thereof are used for explaining the present invention, and do not constitute an improper limitation of the present invention.

DETAILED DESCRIPTION

It should be noted that, the following detailed descriptions are all exemplary, and are intended to provide further descriptions for the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention.

The embodiments of the present invention and the features of the embodiments may be combined with each other without conflict.

Embodiment I

As described in the background, according to the existing virtual synchronous generator technology for inverters, it is difficult for the system frequency to regress to the fundamental frequency from which it once deviates under large inertia conditions. Under the condition of small inertia, the micro-grid system has weak anti-interference ability and poor system stability, which leads to poor control effect. In order to solve this problem, this embodiment provides a model predictive virtual synchronous generator inverter control method considering a frequency-movement direction.

Figure 1:
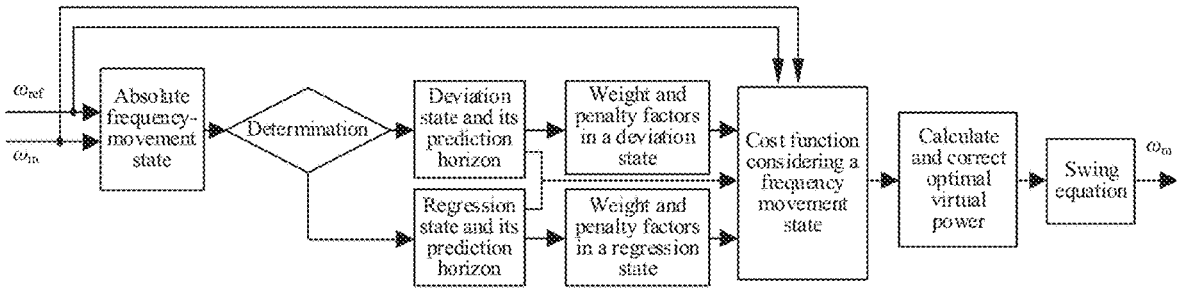
FIG. 1 is a schematic control block diagram according to an embodiment of the present invention.
Figure 4:
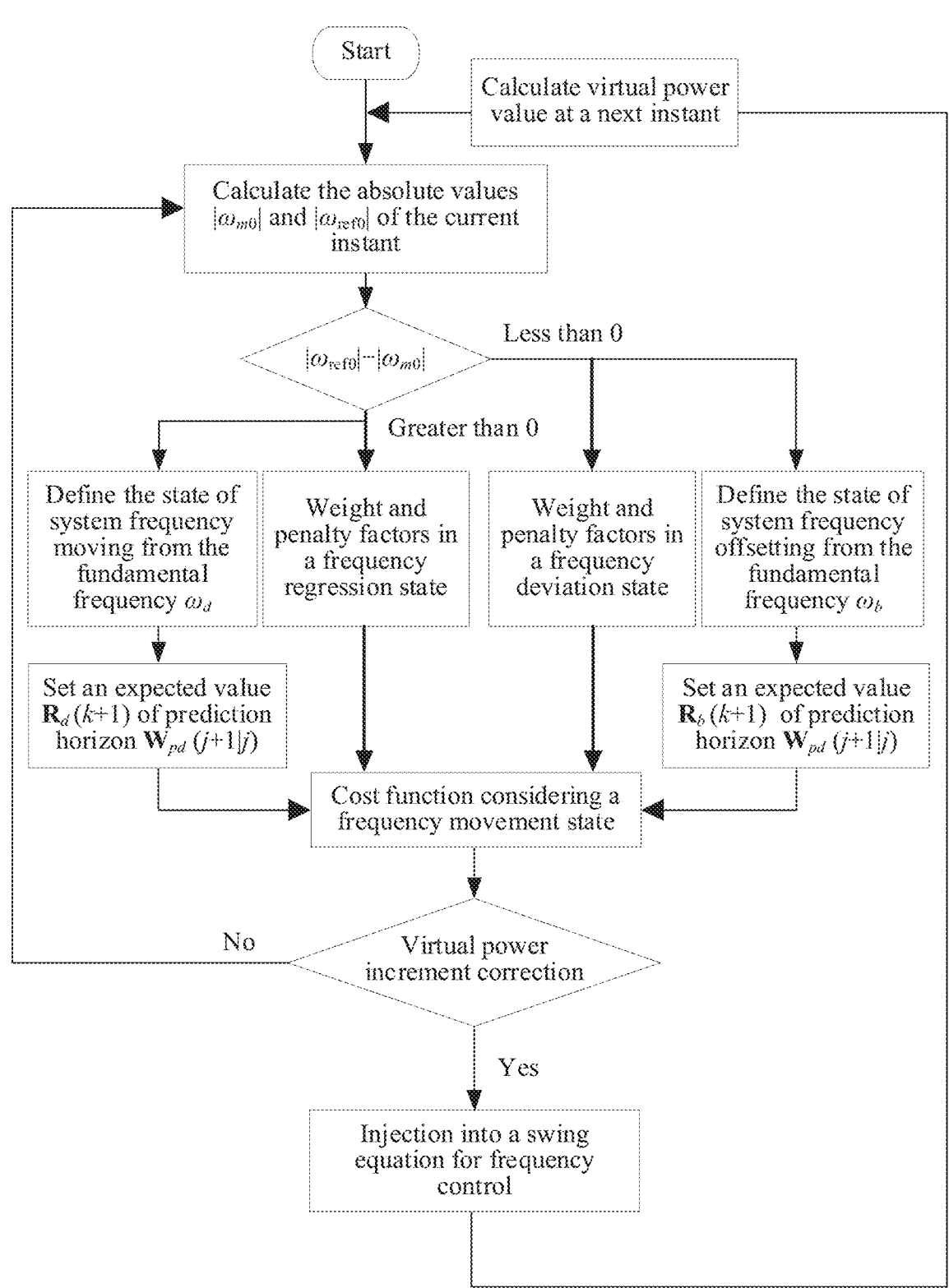
FIG. 4 is a flow chart of virtual synchronous generator model predictive control according to an embodiment of the present invention.

Specifically, as shown in FIG. 1 and FIG. 4, the model predictive virtual synchronous generator inverter control method considering a frequency-movement direction of this embodiment includes:

Step 1: a system frequency $\omega_m$ of output of an inverter in a micro-grid island mode is detected, a system steady-state frequency $\omega_{ref}$ is calculated from the current output power of the inverter, and the frequency absolute value $|\omega_{m0}(k)|$ based on the fundamental frequency is an absolute value of the difference between the system frequency $\omega_m$ and the fundamental frequency $\omega_0$; and the steady-state frequency absolute value $|\omega_{ref0}(k)|$ based on the fundamental frequency is an absolute value of the difference between the steady-state frequency $\omega_{ref}$ and the fundamental frequency $\omega_0$.

Specifically, the frequency absolute value $|\omega_{m0}(k)|$ at the $k^{th}$ instant based on the fundamental frequency $\omega_0$ and the steady-state absolute value $|\omega_{ref0}(k)|$ based on the fundamental frequency $\omega_0$ are determined, with the calculation formula thereof as follows:

$$\begin{cases} |\omega_{m0}(k)| & = |\omega_m(k) - \omega_0| \\ |\omega_{ref0}(k)| & = |\omega_{ref}(k) - \omega_0| \end{cases}$$

In this step, the system frequency $\omega_m$ is an output frequency output by the inverter, and the steady-state frequency $\omega_{ref}$ is derived from the curve of droop control P–$\omega$ of the inverter.

Step 2: in order to determine the system frequency-movement state, an absolute value $|\omega_{m0}(k)|$ of the current frequency value $\omega_m$ based on the fundamental frequency is compared with an absolute value $|\omega_{ref0}(k)|$ of the steady-state frequency value $\omega_{ref}$ based on the fundamental frequency, with the determination formula thereof as follows:

$$\begin{cases} |\omega_{m0}(k)| - |\omega_{ref0}(k)| < 0 & \text{deviating from the fundamental frequency} \\ |\omega_{m0}(k)| - |\omega_{ref0}(k)| > 0 & \text{regressing to the fundamental frequency} \end{cases}$$

In order to realize the frequency control considering the frequency-movement state, it is necessary to determine the current system frequency state.

when $|\omega_{m0}(k)| - |\omega_{ref0}(k)| < 0$, it is determined that the system frequency $\omega_m$ is in a state of deviating from the fundamental frequency; and when $|\omega_{m0}(k)| - |\omega_{ref0}(k)| > 0$, it is determined that the system frequency $\omega_m$ is in a state of regressing to the fundamental frequency.

Figure 2:
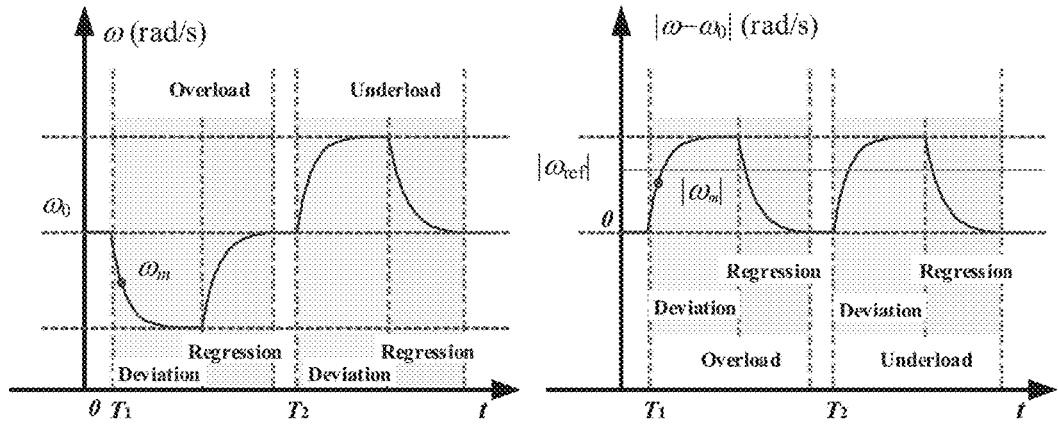
FIG. 2 is a movement state determination diagram according to an embodiment of the present invention.

FIG. 2 show waveforms of the system frequency and the absolute value of the frequency based on the fundamental frequency, and it can be seen from the simulation results that in different load switching states, the system frequency is in a deviation state, and the absolute value of the frequency is less than the absolute value of the expected frequency; and when the system frequency is in a regression state, the absolute value of the frequency is greater than the absolute value of the expected frequency.

Step 3: a corresponding prediction output horizon is set according to the frequency-movement state, and a cost function considering the frequency-movement state is constructed, including a prediction horizon minimization target for a frequency-movement fluctuation value and a prediction horizon minimization target for a frequency regression fluctuation value.

When the system frequency om is in a state of deviating from the fundamental frequency, a prediction horizon output $W_{pd}(j+1|j)$ of the frequency-movement fluctuation value is constructed, i.e., the value of j+1 instant is predicted from the j instant (j=k, k+1 . . . ), and an expected value $R_d(k+1)=[0\ 0\ \ldots\ 0]^T$ in the deviation state (an expected value at k+1 instant) is set; and when the system frequency $\omega_m$ is in a state of regressing to the fundamental frequency, the prediction horizon output $W_{pb}(j+1|j)$ of the frequency regression fluctuation value is constructed, and an expected value $R_b(k+1)=[0\ 0\ \ldots\ 0]^T$ in the regression state is set.

Further, by optimizing the virtual power increment value in an incremental model, the system frequency $\omega_m$ can be adjusted effectively in different states.

In order to adapt to different optimization objectives in a frequency-deviation state and a frequency regression state, the cost function $F_p$ considering the frequency-movement state is constructed.

The derivation process is described in detail below:

The incremental model is derived from a discrete model of a swing equation of the virtual synchronous generator technology, and its calculation formula is as follows:

$$\Delta\omega_m(k+1) = \omega_m(k+1) - \omega_m(k)$$

$$= A_e\Delta\omega_m(k) + B_u\Delta P_m(k) + B_d\Delta P_{out}(k)$$

where $$A_e = 1 - \frac{T_s D}{J}, B_u = \frac{T_s}{J}, B_d = -\frac{T_s}{J}, T_s$$

is a control period, J is a moment of inertia, $P_m$ is virtual power, $P_{out}$ is output power and D is a damping coefficient.

1). When in the state of the system frequency deviating from the fundamental frequency, the frequency-movement fluctuation value $\omega_d$ is defined to be $$\omega_d(j) = \omega_m(j) - \omega_m(k)(j=k,k+1, \ldots, p)$$

a prediction horizon is defined asp steps, assuming that the system reaches a steady state in step m. Then, the prediction horizon output $W_{pd}(j+1|j)$ for the frequency-movement fluctuation value $\omega_d$ is $$W_{pd}(j+1|j) = S_x\Delta\omega_d(j) + I\omega_d(j) + S_d\Delta P_{out}(j) + S_u\Delta P(j)$$

where $$I = [1\ 1\ \ldots\ 1]_{1\times p}^T, P(k) = [\Delta P_m(k)\ \Delta P_m(k+1)\ \ldots\ \Delta P_m(k+m-1)]_{1\times m}^T,$$

$$S_x = \left[ A_e\ \sum_{i=1}^{2}A_e^i\ \ldots\ \sum_{i=1}^{p}A_e^i \right]_{1\times p}^T,$$

$$S_d = \left[ B_d\ \sum_{i=1}^{2}A_e^{i-1}B_d\ \ldots\ \sum_{i=1}^{p}A_e^{i-1}B_d \right]_{1\times p}^T,$$

-continued $$S_u = \begin{bmatrix} B_u & 0 & \ldots & 0 \\ \sum_{i=1}^{2} A_e^{i-1} B_u & B_u & \ldots & 0 \\ \ldots & \ldots & \ldots & 0 \\ \sum_{i=1}^{p} A_e^{i-1} B_u & \sum_{i=1}^{p-1} A_e^{i-1} B_u & \ldots & \sum_{i=1}^{p-m+1} A_e^{i-1} B_u \end{bmatrix}_{p \times m}$$

2). When the frequency regresses to the fundamental frequency from the deviation value, the frequency regression fluctuation value $\omega_b$ is defined to be $$\omega_b(j) = \omega_m(j) - \omega_{ref} \, j = k, k+1, \ldots, p$$

Where $\omega_{ref}$ is a steady-state frequency expected value.

Further, the prediction horizon output $W_{pb}(j+1|j)$ for the frequency regression fluctuation value $\omega_b$ is $$W_{pb}(j+1|j) = S_x \Delta \omega_b(j) + I \omega_b(j) + S_d \Delta P_{out}(j) + S_u \Delta P(j)$$

Therefore, when the frequency deviates from the fundamental frequency, in order to achieve slow frequency movement, the prediction horizon output $W_{pd}(j+1|j)$ of the frequency-deviation fluctuation value $\omega_d$ should be 0, i.e., $R_d(k+1) = [0 \ 0 \ldots 0]^T$; and when the frequency regresses from the deviation value to the fundamental frequency, in order to achieve frequency-accelerated regression, the prediction horizon output $W_{pb}(j+1|j)$ of the frequency regression fluctuation value $\omega_b$ is 0, i.e., $R_b(k+1) = [0 \ 0 \ldots 0]^T$.

Further, the prediction horizon output $W_{pd}(j+1|j)$ for the frequency-deviation fluctuation value $\omega_d$ and the prediction horizon output $W_{pb}(j+1|j)$ for the frequency regression fluctuation value $w_b$ are integrated, and the cost function considering the frequency-movement state is constructed as follows:

$$F_p = \min\{\|\Gamma_d W_{pd}(k+1|k) - R_d(k+1)\|^2 + \|\Gamma_b W_{pd}(k+1|k) - R_b \\ (k+1)\|^2 + \|\Gamma_p \Delta P(k)\|^2\}$$

where $\Gamma_d$ is a deviation state weight factor matrix, $\Gamma_b$ is a regression state weight factor matrix, and $\Gamma$ is a power fluctuation penalty factor matrix.

Step 4; in order to achieve the frequency optimization control targets under different movement states, the assignments of matrixes $\Gamma_d$, $\Gamma_b$ and $\Gamma$ are different according to different frequency-movement states.

When in the state of the system frequency deviating from the fundamental frequency, a weighting factor and a penalty factor are assigned to optimize the frequency change rate to be the minimum, and an optimal virtual power increment value under the frequency-movement state is calculated to slow down the deviation of the system frequency $\omega_m$ and effectively reduce the frequency change rate.

Specifically, in the frequency-deviation state, priority is given to realizing the optimization of the prediction horizon output $W_{pd}(j+1|j)$ for the frequency-deviation fluctuation value $\omega_d$, and its assignment is as follows:

frequency-deviation state:

$$\begin{cases} \Gamma_d & = \text{diag}(\lambda_d, \lambda_d, \ldots, \lambda_d) \\ \Gamma_b & = \text{diag}(0, 0, \ldots, 0) \\ \Gamma_p & = \text{diag}(\lambda_1, \lambda_1, \ldots, \lambda_1) \end{cases}$$

When in the state of the frequency regressing to the fundamental frequency state, the weight factor and the penalty factor are assigned to optimize the difference between a steady-state value and a frequency to be the minimum, and the optimal virtual power increment value is calculated.

Specifically, when in the state of the system frequency regressing to the fundamental frequency state, the weighting factor and the penalty factor are assigned to calculate the optimal virtual power increment value in the frequency regression state to accelerate the system frequency $\omega_m$ to regress to the fundamental frequency, and effectively and rapidly increase the frequency change rate, priority is given to realizing the dominance of optimization of the prediction horizon output $W_{pd}(j+1|j)$ for the frequency regression fluctuation value $\omega_b$, and the assignment thereof is as follows:

$$\text{frequency regression state:} \begin{cases} \Gamma_d & = \text{diag}(0, 0, \ldots, 0) \\ \Gamma_b & = \text{diag}(\lambda_b, \lambda_b, \ldots, \lambda_b) \\ \Gamma_p & = \text{diag}(\lambda_2, \lambda_2, \ldots, \lambda_2) \end{cases}$$

According to the extreme value theory, the optimal virtual power increment $\Delta P^*(k)$ under different frequency-movement states is calculated.

Step 5: the optimal virtual power is calculated according to the optimal virtual power increment value and the virtual power, and the expression thereof is $$P^*(k) = \Delta P^*(k) + P(k)$$

In order to ensure the reliability of the system, it needs to determine whether the optimal virtual power $P^*(k)$ exceeds an adjustable range thereof, and when correcting the correctness of the virtual power, whether the optimal virtual power exceeds a selectable range of the virtual power, and if so, step 1 is performed; otherwise, the calculated virtual power is input into a swing equation of a virtual synchronous generator, i.e., $$J \frac{d(\omega_m - \omega_0)}{dt} = P_m - P_{out} - D(\omega_m - \omega_0)$$

the calculated virtual angular velocity $\omega_m$ is input to an integral link to achieve optimal virtual power frequency adjustment.

According to the present invention, the system frequency is ultimately adjusted by injecting the optimal virtual power into the virtual synchronous power generation swing equation considering the frequency-movement state.

It should be noted that, the technical solutions of the present invention include virtual synchronous generator increment model establishment, system frequency-movement state determination, cost function considering the frequency-movement state, optimization of virtual power increment, and virtual power adjustment of frequency. The present invention determines a system frequency-movement state by using an absolute value of a frequency-movement based on the fundamental frequency, and further sets a frequency optimization target in different frequency-movement states.

The present invention considers the frequency-movement direction, and is based on a model predictive method of the virtual synchronous generator, realizing realizes the adjustment of the system frequency by optimizing the virtual power in different movement states. When the frequency deviates from the fundamental frequency, the frequency changes slowly to suppress the frequency-deviation; and when the frequency regresses to the fundamental frequency, the frequency change is accelerated to cause the frequency to quickly regress to the fundamental frequency. In addition, the characteristics of real-time optimization of model prediction improve the control effect. The present invention can solve the effect on the frequency caused micro-grid load switching, and the implementation method is simple and reliable. Therefore, it is of great significance for the application of the inverter.

The present invention is a real-time optimization process to achieve the optimal regulation of the system frequency in a frequency-deviation state and a frequency regression state to improve the performance of the inverter.

In addition, the present invention is not limited to specific micro-grid practical requirements, is not limited to inverter topologies, and is applicable to micro-grid single-phase bus and three-phase bus forms. In addition, the present invention is not limited to a DC side power supply form of the inverter, and is applicable to different situations such as low voltage, medium voltage, and high voltage, and has strong scalability and practicality.

Simulation Case

Figure 3:
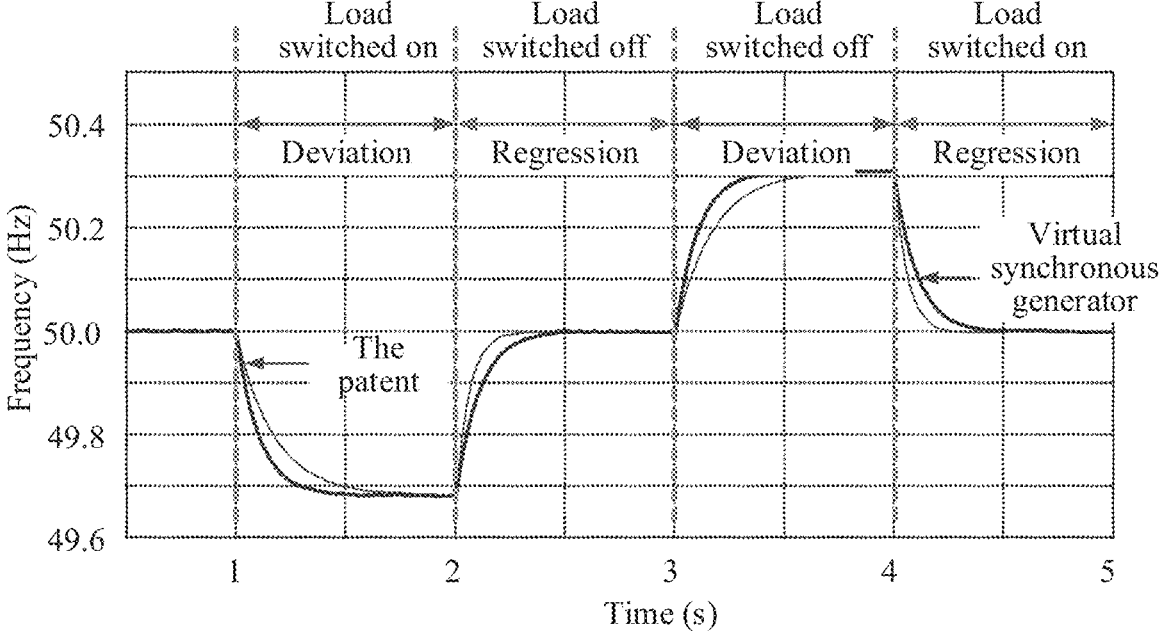
FIG. 3 is a frequency waveform using a virtual synchronous generator method and a frequency waveform using the present invention in different load switching states.

FIG. 3 shows a frequency waveform controlled by a fixed inertia virtual synchronous generator and a frequency waveform controlled by the method of the present invention, and it can be seen from the simulation results that the frequency-movement speed of the method of the present invention is less than the frequency-movement speed of the virtual synchronous generator when the frequency deviates from the fundamental frequency in different load switching states; and when the frequency regresses to the fundamental frequency, the frequency-movement speed of the method of the present invention is greater than the frequency-movement speed of the virtual synchronous generator.

It can be seen from the above simulation results that the model predictive virtual synchronous generator inverter control method considering a frequency-movement direction provided by the present invention can effectively improve the dynamic characteristic capability of the inverter to regulate frequency.

In another embodiment, a virtual synchronous generator inverter is further included, which is controlled by using the above-mentioned method to achieve different frequency adjustment targets, i.e.: when the frequency deviates from the fundamental frequency, the frequency change rate is effectively reduced to achieve slow frequency-movement; and when the frequency regresses to the fundamental frequency from the non-fundamental frequency value, the frequency change rate is increased effectively and quickly, so that the frequency regresses quickly.

Embodiment II

An objective of this embodiment is to provide a computing device including a memory, a processor and a computer program stored on the memory and executable on the processor, and when the processor executes the program, the steps of the method described above are implemented.

Embodiment III

An objective of this embodiment is to provide a computer-readable storage medium.

The computer-readable storage medium has a computer program stored thereon, and the program when executed by a processor, performs the steps of the above method.

Embodiment IV

An objective of this embodiment is to provide a model predictive virtual synchronous generator inverter control system considering a frequency-movement direction, which includes:

a frequency-movement state determination module configured to obtain a current frequency absolute value based on fundamental frequency of an inverter and a steady-state absolute value based on the fundamental frequency of the inverter;

determining a frequency-movement state by comparing the above two absolute values: in a state of deviating from the fundamental frequency or a state of regressing to the fundamental frequency;

a frequency-adjustment module configured to set a corresponding prediction output horizon according to the frequency-movement state, and construct a cost function considering the frequency-movement state; and calculate an optimal virtual power increment value based on the cost function, then calculate an optimal virtual power, input the optimal virtual power to a swing equation of a virtual synchronous generator, and perform frequency adjustment according to an output value.

The steps involved in the devices of Embodiments II, III and IV above correspond to those of method Embodiment I, and for specific implementations, reference can be made to the relevant descriptions of Embodiment I. The term "computer-readable storage medium" shall mean a single medium or multiple media including one or more sets of instructions; It should also be understood to include any medium capable of storing, encoding, or carrying a set of instructions for execution by the processor and causing the processor to perform any of the methods of the present invention.

It will be appreciated by a person skilled in the art that the various modules or steps of the present invention described above may be implemented in a general-purpose computing device. Optionally, they may be implemented in program code executable by the computing device, such that they may be stored in a storage device and executed by the computing device, or they may be fabricated as individual integrated circuit modules separately, or multiple modules or steps thereof may be fabricated as a single integrated circuit module. The present invention is not limited to any specific combination of hardware and software.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A model predictive virtual synchronous generator inverter control method considering a frequency-movement direction, comprising obtaining a current frequency absolute value based on fundamental frequency of an inverter and a steady-state absolute value based on the fundamental frequency of the inverter;

determining a frequency-movement state by comparing the above two absolute values: in a state of deviating from the fundamental frequency or a state of regressing to the fundamental frequency;

setting a corresponding prediction output horizon according to the frequency movement state, and constructing a cost function considering the frequency-movement state; and calculating an optimal virtual power increment value based on the cost function, then calculating an optimal virtual power, inputting the optimal virtual power to a swing equation of a virtual synchronous generator, and performing frequency adjustment according to an output value based on the swing equation.

2. The model predictive virtual synchronous generator inverter control method considering a frequency-movement direction according to claim 1, wherein the obtaining a current frequency absolute value based on fundamental frequency of an inverter and a steady-state absolute value based on the fundamental frequency of the inverter comprises:

detecting a system frequency of output of an inverter in a micro-grid island mode, calculating a system steady-state frequency from a current power of the inverter, and determining the current frequency absolute value based on the fundamental frequency and the steady-state absolute value based on the fundamental frequency.

3. The model predictive virtual synchronous generator inverter control method considering a frequency-movement direction according to claim 1, wherein when determining the frequency-movement state, if the current frequency absolute value based on the fundamental frequency is less than the steady-state absolute value based on the fundamental frequency, it is in a state of deviating from the fundamental frequency; and if the current frequency absolute value based on the fundamental frequency is greater than the steady-state absolute value based on the fundamental frequency, it is in a state of regressing to the fundamental frequency.

4. The model predictive virtual synchronous generator inverter control method considering a frequency-movement direction according to claim 1, wherein the cost function considering the frequency-movement state comprises a prediction horizon minimization target for a frequency-movement fluctuation value and also comprises a prediction horizon minimization target for a frequency regression fluctuation value;

in a frequency-deviation state, priority is given to realizing the optimization of the prediction horizon output for the frequency-deviation fluctuation value through assignment; and in a frequency regression state, priority is given to realizing the optimization of the prediction horizon output for the frequency regression fluctuation value through assignment.

5. The model predictive virtual synchronous generator inverter control method considering a frequency-movement direction according to claim 1, wherein the optimal virtual power is calculated from the optimal virtual power increment value and the virtual power.

6. The model predictive virtual synchronous generator inverter control method considering a frequency-movement direction according to claim 1, wherein after calculating the optimal virtual power, a step of correcting the optimal virtual power is further comprised, whether the calculated optimal virtual power exceeds a virtual power selectable range is determined, and if so, the current frequency absolute value based on the fundamental frequency of the inverter and the steady-state absolute value based on the fundamental frequency of the inverter are re-obtained, and the optimal virtual power is calculated again;

otherwise, the calculated optimal virtual power is directly input into the swing equation of the virtual synchronous generator, and the calculated virtual angular velocity is output to an integral link to achieve optimal virtual power frequency adjustment.

7. A model predictive virtual synchronous generator inverter control system considering a frequency-movement direction, comprising a frequency-movement state determination module configured to obtain a current frequency absolute value based on fundamental frequency of an inverter and a steadystate absolute value based on the fundamental frequency of the inverter;

determine a frequency-movement state by comparing the above two absolute values: in a state of deviating from the fundamental frequency or a state of regressing to the fundamental frequency;

a frequency-adjustment module configured to set a corresponding prediction output horizon according to the frequency-movement state, and construct a cost function considering the frequency-movement state; and calculate an optimal virtual power increment value based on the cost function, then calculate an optimal virtual power, input the optimal virtual power to a swing equation of a virtual synchronous generator, and perform frequency adjustment according to an output value based on the swing equation.

8. A computing device, comprising a memory, a processor and a computer program stored on the memory and executable on the processor, wherein the processor, when executing the program, implements the steps of the method according to claim 1.

9. A computer-readable storage medium having a computer program stored thereon, wherein the program when executed by a processor, performs the steps of the method according to claim 1.

10. A virtual synchronous generator inverter controlled by the method according to claim 1 to achieve different frequency adjustment targets.

* * * * *